(12) United States Patent
Yang et al.

(10) Patent No.: US 9,912,863 B2
(45) Date of Patent: Mar. 6, 2018

(54) GUIDE SPECTACLE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Feng Bai, Beijing (CN); Xiao Sun, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 237 days.

(21) Appl. No.: 14/762,639

(22) PCT Filed: Nov. 4, 2014

(86) PCT No.: PCT/CN2014/090249
§ 371 (c)(1),
(2) Date: Jul. 22, 2015

(87) PCT Pub. No.: WO2015/169072
PCT Pub. Date: Nov. 12, 2015

(65) Prior Publication Data
US 2016/0255270 A1    Sep. 1, 2016

(30) Foreign Application Priority Data
May 9, 2014    (CN) .......................... 2014 1 0193383

(51) Int. Cl.
*H04N 5/232*     (2006.01)
*H04R 1/02*      (2006.01)
(Continued)

(52) U.S. Cl.
CPC ......... *H04N 5/23229* (2013.01); *A61H 3/061* (2013.01); *G02C 11/10* (2013.01);
(Continued)

(58) Field of Classification Search
CPC ............ A61H 3/061; A61H 2201/1604; A51H 2201/165; H04N 5/23229; H04R 1/028; G06F 3/16; G02C 11/10
See application file for complete search history.

(56) References Cited

U.S. PATENT DOCUMENTS

| 3,654,477 A | 4/1972 | Benjamin, Jr. |
| 2002/0067271 A1* | 6/2002 | Depta ........................ A61F 9/08 340/573.1 |
| 2012/0062351 A1 | 3/2012 | Slamka |

FOREIGN PATENT DOCUMENTS

| CN | 101498845 A | 8/2009 |
| CN | 101797197 A | 8/2010 |

(Continued)

OTHER PUBLICATIONS

International Search Report dated Feb. 11, 2015 issued in corresponding International Application No. PCT/CN2014/090249 along with an English translation of the Written Opinion of the International Searching Authority.

(Continued)

*Primary Examiner* — Huy T Nguyen
(74) *Attorney, Agent, or Firm* — Nath, Goldberg & Meyer; Joshua B. Goldberg; Annie J. Kock

(57) ABSTRACT

The present invention provides a guide spectacle, belonging to the field of intelligent control technology, which is capable of solving the problem of inconvenience during going out of the blind. The guide spectacle provided by the present invention include a spectacle frame with a signal collecting unit, a central processing unit and a functional unit provided thereon. The signal collecting unit is used for (Continued)

collecting image information and voice information and sending the collected information to the central processing unit. The central processing unit processes the received information. The functional unit carries out corresponding functional operations according to a processing result of the central processing unit. The guide spectacle provided by the present invention greatly alleviates the problem of inconvenience for the blind during going out.

13 Claims, 2 Drawing Sheets

(51) Int. Cl.
*A61H 3/06* (2006.01)
*G02C 11/00* (2006.01)
*G06F 3/16* (2006.01)
*H04R 1/10* (2006.01)
*H04R 3/00* (2006.01)

(52) U.S. Cl.
CPC .......... *G06F 3/16* (2013.01); *A61H 2003/063* (2013.01); *A61H 2201/1604* (2013.01); *A61H 2201/165* (2013.01); *A61H 2201/501* (2013.01); *A61H 2201/5058* (2013.01); *A61H 2201/5092* (2013.01); *H04R 1/028* (2013.01); *H04R 1/1033* (2013.01); *H04R 3/00* (2013.01); *H04R 2460/13* (2013.01)

(56) References Cited

FOREIGN PATENT DOCUMENTS

| | | |
|---|---|---|
| CN | 201788327 U | 4/2011 |
| CN | 202312225 U | 7/2012 |
| CN | 202533672 U | 11/2012 |
| CN | 202563194 U | 11/2012 |
| CN | 102885685 A | 1/2013 |
| CN | 203117585 U | 8/2013 |
| CN | 203149238 U | 8/2013 |
| CN | 203164544 U | 8/2013 |
| CN | 103385795 A | 11/2013 |
| CN | 203280695 U | 11/2013 |
| CN | 103428601 A | 12/2013 |
| CN | 203447481 U | 2/2014 |
| CN | 103720576 A | 4/2014 |
| CN | 103750987 A | 4/2014 |
| CN | 104000709 A | 8/2014 |
| JP | 2006251596 A | 9/2006 |
| KR | 20100123036 A | 11/2010 |

OTHER PUBLICATIONS

Office Action dated Jul. 1, 2015 issued in corresponding Chinese Application No. 201410193383.9.
Office Action dated Nov. 23, 2015 issued in corresponding Chinese Application No. 201410193383.9.
Office Action dated Nov. 9, 2016 issued in corresponding Chinese Application No. 201410193383.9.
European search report dated Nov. 10, 2017 for corresponding EP application 14891264.5.

* cited by examiner

GUIDE SPECTACLE

This is a National Phase Application filed under 35 U.S.C. 371 as a national stage of PCT/CN2014/090249, filed Nov. 4, 2014, an application claiming the benefit of Chinese Application No. 201410193383.9, filed May 9, 2014, the content of each of which is hereby incorporated by reference in its entirety.

FIELD OF THE INVENTION

The present invention belongs to the field of intelligent control technology, and particularly relates to a guide spectacle.

BACKGROUND OF THE INVENTION

Due to the inherent visual defects, the blind suffers a lot of inconvenience in daily lives. In particular, obstacles on roads and vehicles travelling on the roads bring potential safety hazards when the blind goes out, resulting in inconvenience for the blind during daily going out.

Currently, most of the blind mainly relies on walking sticks to explore road conditions ahead while going out, and of course, a few of the blind relies on accompanying guide dogs while going out. However, the inventor has found that at least the following problems exist in the prior art: the functions of the walking sticks are limited and cannot well adapt to the current complicated road conditions; in the event of emergencies, the guide dogs are likely to be frightened to threaten the safety of surrounding pedestrians.

SUMMARY OF THE INVENTION

The technical problem to be solved in the present invention includes providing a guide spectacle for assisting the blind during going out, in view of the problem of inconvenience for the blind during going out.

The technical solution used for solving the technical problem in the present invention is a guide spectacle, including a spectacle frame with a signal collecting unit, a central processing unit and a functional unit provided thereon, wherein the signal collecting unit is used for collecting image information and voice information;

the central processing unit receives information from the signal collecting unit and processes the received information; and the functional unit carries out corresponding functional operations according to a processing result of the central processing unit.

According to the guide spectacle provided by the present invention, the image information and the voice information are collected by the signal collecting unit, wherein the voice information is mainly the voice information of a blind user, and the image information is mainly road surface and surrounding environment information, and then the collected image information and the voice information are analyzed and processed by the central processing unit, which then instructs the functional unit to carry out corresponding functional operations. The spectacle can effectively help the blind solve problems during going out and ensure safer going out for the blind. Moreover, the spectacle can help anyone especially disabled, aged or assistance needed people to make a more convenient and safer move on road.

Preferably, the signal collecting unit includes a microphone, and the microphone is used for collecting the voice information and sending the collected voice information to the central processing unit for processing.

Preferably, the signal collecting unit includes a camera, and the camera is used for collecting road surface and surrounding environment information and sending the road surface and surrounding environment information to the central processing unit for processing.

Further preferably, the functional unit includes a positioning unit, the central processing unit performs comparison and calculation processing according to the road surface and surrounding environment information received from the camera and road surface and surrounding environment information pre-stored in a database of the central processing unit, and the positioning unit performs positioning of current position according to a result of the comparison and calculation processing.

Preferably, the signal collecting unit includes a ranging unit used for ranging a target object in the surrounding environment and sending ranging information to the central processing unit.

Further preferably, the functional unit includes a warning unit, and the central processing unit performs comparison processing according to the ranging information on distance from the target object received from the ranging unit and a dangerous distance pre-stored in the database of the central processing unit, and the warning unit performs warning according to a result of the comparison processing.

Further preferably, the ranging unit is any one of a Doppler effect-based ranging unit, an ultrasonic rangefinder, an infrared rangefinder and a laser rangefinder.

Preferably, the guide spectacle further includes an audio play unit, and the audio play unit is used for outputting the functional operations carried out by the functional unit as audio information.

Further preferably, the audio play unit is a bone conduction earphone arranged on the spectacle frame.

Preferably, the guide spectacle further includes a lens and a solar power supply unit arranged on the lens, wherein the solar power supply unit is used for supplying power to the signal collecting unit, the central processing unit and the functional unit.

Preferably, a data transmission unit is further arranged on the spectacle frame, and the data transmission unit is used for communicating data with an external device.

Figure 1:
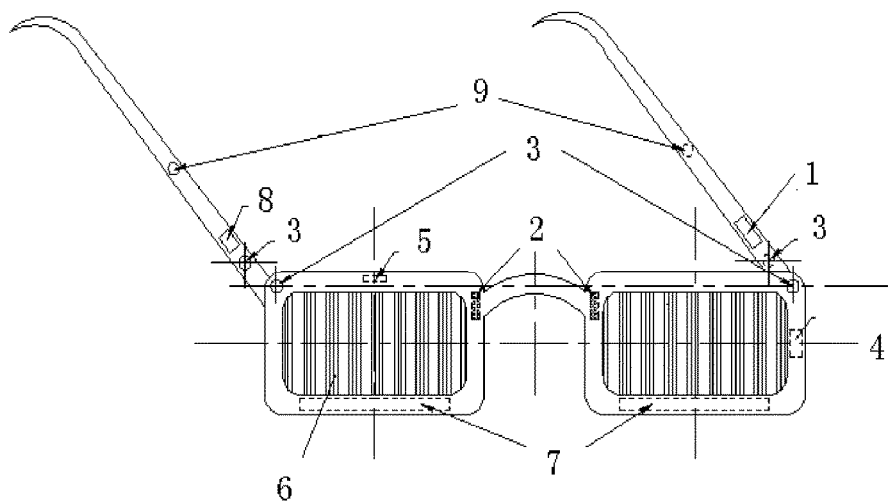
FIG. 1 is a schematic diagram of an exterior structure of a guide spectacle in the present invention.

Reference numerals: 1. central processing unit; 2. microphone; 3. camera; 4. positioning unit; 5. ranging unit; 6 solar power supply unit; 7. storage battery unit; 8. data transmission unit; 9. bone conduction earphone.

DETAILED DESCRIPTION OF THE EMBODIMENTS

In order that those skilled in the art can better understand the technical solutions of the present invention, a further detailed description of the present invention will be given below in combination with the accompanying drawings and specific embodiments.

Figure 2:
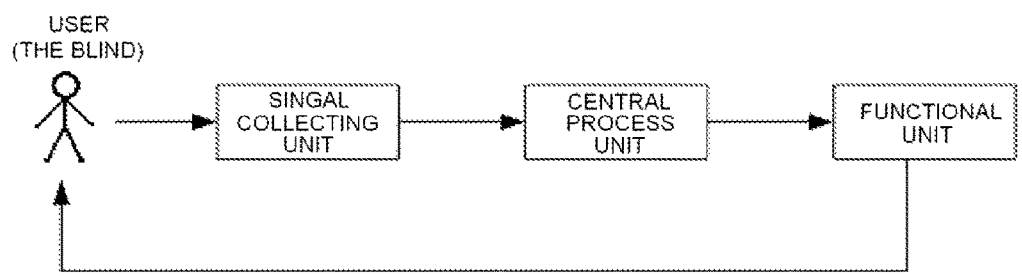
FIG. 2 is a schematic block diagram of modular units of the guide spectacle in the present invention.
Figure 3:
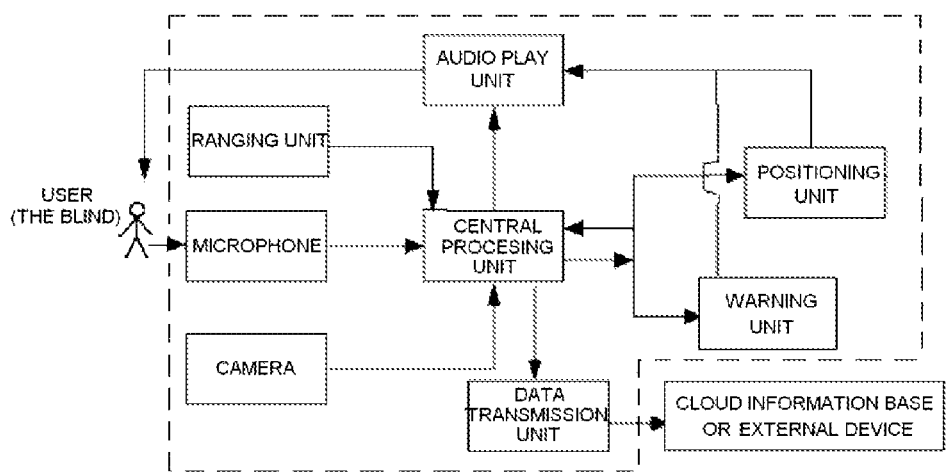
FIG. 3 is a schematic block diagram of a preferable structure of the guide spectacle in the present invention.

FIGS. 1-3 show a schematic diagram of an exterior structure and a structural block diagram of modular units of a guide spectacle in a preferable embodiment of the present invention, wherein the dashed box part in FIG. 3 is a preferred modular structure of the guide spectacle in the present invention. As shown in the figures, the embodiment provides a guide spectacle, including a spectacle frame, wherein the spectacle frame is provided with a signal collecting unit, a central processing unit 1 and a functional unit; the signal collecting unit is used for collecting image information and voice information and sending the collected information to the central processing unit 1; the central processing unit 1 processes the received information; and the functional unit carries out corresponding functional operations according to a processing result of the central processing unit 1.

According to the guide spectacle of the embodiment, the image information and the voice information are collected by the signal collecting unit, wherein the voice information is mainly the voice information of a blind user, and the image information is mainly road surface and surrounding environment information. The collected image information and the voice information are analyzed and processed by the central processing unit 1, which then instructs the functional unit to carry out corresponding functional operations. The spectacle is able to effectively helping the blind solve problems during going out and ensure safer going out for the blind. Moreover, the spectacle can help anyone especially disabled, aged or assistance needed people to make a more convenient and safer move on road.

The signal collecting unit in the embodiment includes a microphone 2, and the microphone 2 is used for sending the collected voice information to the central processing unit 1 for processing. Specifically, a user can produce the voice information (for example, saying a word is equivalent to sending an instruction), the voice information is collected by the microphone, undergone a series of data conversion processing, and then transmitted to the central processing unit 1 in a format that can be processed by a processor. The central processing unit 1 analyzes and processes the voice information, and then instructs the corresponding functional module to carry out corresponding functional operations according to an analysis and processing result. The microphone 2 can collect the voice information instruction produced by the blind himself/herself to help the blind during going out and alleviate the inconvenience of the blind caused by visual defects.

The signal collecting unit in the embodiment further includes a camera 3, and the camera 3 is used for collecting the road surface and surrounding environment information and sending the road surface and surrounding environment information to the central processing unit 1 for processing. It should be noted that the cameras 3 may be arranged all around, including being arranged in front of the spectacle frame and at the outer sides of left and right spectacle legs of the spectacle frame. In this arrangement manner, the road surface and surrounding environment information can be collected all around to achieve omnibearing monitoring, so as to ensure the highest safety protection level for the user. Of course, the camera 3 may also be only arranged in front of the spectacle frame, and in this arrangement manner, information ahead in the walking route of the user can be collected to enable the user to monitor the barriers ahead in real time. In this case, one camera 3 may be arranged, or two cameras 3 may also be arranged. The purpose of arranging two cameras 3 lies in that one camera 3 can still work normally when the other camera has failure.

Further preferably, the functional unit includes a positioning unit 4, and the positioning unit 4 is connected with the central processing unit 1. In this case, the central processing unit 1 performs comparison and calculation processing according to the road surface and surrounding environment information received from the camera 3 and the road surface and surrounding environment information pre-stored in a database of the central processing unit 1. The positioning unit 4 performs positioning of the current position according to a result of the comparison and calculation processing. That is, a navigation function can be achieved by the positioning unit 4 to ensure safer and more convenient going out for the blind. Preferably, when the positioning unit 4 navigates the user, information on the position determined by the positioning unit may also be stored as a historical record. For example, the information on position may be stored in a storage unit arranged on the blind-guide spectacle, or is sent and stored in an internal storage device of a remote computer in a wireless manner. In this manner, when the user wants to go back the same way, the positioning unit 4 can navigate the user by referring to the historical record, so that the central processing unit 1 does not need to perform comparison and calculation processing again. In addition, when needing to obtain the current position of the user, the family of the user can conveniently obtain related information by operating the above-mentioned remote computer.

According to the blind-guide spectacle in the embodiment, preferably, the signal collecting unit includes a ranging unit 5 used for ranging a target object in the surrounding environment and sending ranging information to the central processing unit 1, wherein, the target object is, for example, barriers on road surfaces and travelling vehicles, etc.

On the basis of the above-mentioned embodiment, the functional unit includes a warning unit. The central processing unit 1 performs comparison processing according to the ranging information on distance from the target object received from the ranging unit 5 and a dangerous distance pre-stored in the database of the central processing unit 1, and the warning unit performs warning according to a result of the comparison processing. Specifically, at first, the ranging unit 5 senses the distance between the current position of the user and the position of the target object in the surrounding environment, and then sends the ranging information to the central processing unit 1. The central processing unit 1 compares distance contained in the ranging information with the dangerous distance pre-stored in the database thereof, and if the comparison result is that the sensed distance is smaller than the dangerous distance, the central processing unit 1 instructs the warning unit to generate warning information. The warning information can be output in a sound form by an audio play unit (which will be described below) for example, and can also be output after being converted by a vibrating unit, for example, into mechanical vibration sensible to the user. In addition, the warning unit can also be implemented as a mechanism warning a near vehicle which is the target object in an effective manner. For example, a radio frequency unit can be arranged in the blind-guide spectacle, when a radio frequency positioning unit matched with the radio frequency unit of the blind-guide spectacle is arranged in a vehicles or other object which is the target object, the driver of the vehicle or a user holding the radio frequency positioning unit will receive the position information of the user of the blind-guide spectacle, so as to evade in time to avoid danger, so that the walking safety of the blind on roads can be improved.

The ranging unit 5 in the embodiment is preferably any one of a Doppler effect-based ranging unit, an ultrasonic rangefinder, an infrared rangefinder and a laser rangefinder.

In the embodiment, the blind-guide spectacle further includes an audio play unit arranged on the spectacle frame of the blind-guide spectacle. The audio play unit is used for outputting the functional operations carried out by the functional unit as audio information according to the instruction of the central processing unit 1. For example, after positioning the current position and the target position, the positioning unit 4 feeds back the information on positions to the central processing unit 1, and the central processing unit 1 enables the audio play unit to output corresponding voice information for transmitting to the user of the guide spectacle, namely achieving a voice navigation function. As another example, when carrying out a warning operation, the warning unit can send the warning information (warning content) to the audio play unit, to output through the audio play unit corresponding voice information for transmitting to the user of the guide spectacle. Of course, the audio play unit can also output other voice such as music and the like according to the instruction of the central processing unit 1.

The audio play unit in the embodiment is preferably a bone conduction earphone 9, and the bone conduction earphone 9 is arranged on the spectacle frame, for example, arranged on a spectacle leg of the spectacle frame. The bone conduction earphone 9 can avoid the interference caused by external noise, and meanwhile can reduce the interference on other people on public occasions. In addition, the solution of adopting the bone conduction earphone 9 can guarantee that the blind user accurately obtains the information in time to reduce accidents. Meanwhile, the earphone may further adopt a telescopic spring design. When necessary, the earphone on the spectacle leg is directly pulled, and the earphone can be pulled out for a proper length to be worn on an ear. After use, at the moment when the earphone is taken off from the ear, the earphone automatically returns into an earphone groove on the spectacle leg by means of a spring wire of the earphone.

The guide spectacle in the embodiment further includes lens(es) and a solar power supply unit 6 arranged on the lens. The solar power supply unit 6 is used for supplying power to the signal collecting unit, the central processing unit 1 and the functional unit. A storage battery unit 7 may also be arranged on the spectacle frame, for supplying power to the signal collecting unit, the central processing unit 1 and the functional unit in the case of no illumination.

A data transmission unit 8 is further arranged on the spectacle frame of the guide spectacle in the embodiment, and the data transmission unit 8 can be used for communicating data with an external device. The data transmission unit 8 includes a wifi unit and/or a Bluetooth unit. For example, through the wifi unit, information transmission between the central processing unit 1 and a cloud information base can be achieved, to achieve more prefect processing function and wireless network connection. Through the Bluetooth unit, data communication with the external device can be achieved. Therefore, the guide spectacle in the embodiment is more intelligent.

It can be understood that the foregoing embodiments are merely exemplary embodiments used for illustrating the principle of the present invention, but the present invention is not limited thereto. Those of ordinary skill in the art can make various variations and improvements without departing from the spirit and essence of the present invention, and these variations and improvements shall fall within the protection scope of the present invention.

The invention claimed is:

1. A guide spectacle, comprising a spectacle frame, wherein the spectacle frame is provided with:
    a signal collecting unit configured to collect image information and voice information;
    a central processing unit configured to receive information from the signal collecting unit and process the received information; and
    a functional unit configured to carry out corresponding functional operations according to a processing result of the central processing unit,
wherein
    the functional unit comprises a positioning unit;
    the signal collecting unit comprises a camera, and the camera is used for collecting road surface and surrounding environment information and sending the road surface and surrounding environment information to the central processing unit for processing;
    the central processing unit performs comparison and calculation processing according to the road surface and surrounding environment information received from the camera and road surface and surrounding environment information pre-stored in a database of the central processing unit; and
    the positioning unit performs positioning of current position according to a result of the comparison and calculation processing.

2. The guide spectacle of claim 1, wherein the signal collecting unit comprises a microphone,
    and the microphone is configured to collect the voice information and send the collected voice information to the central processing unit for processing, such that the central processing unit instructs the functional unit to carry out corresponding functional operations according to the processing result of the collected voice information.

3. The guide spectacle of claim 1, wherein the signal collecting unit comprises a ranging unit; and
    the ranging unit is configured to measure a distance between a current position of a user of the guide spectacle and a position of a target object in the surrounding environment and sending the distance information to the central processing unit.

4. The guide spectacle of claim 3, wherein the functional unit comprises a warning unit; and
    the central processing unit performs comparison processing according to the ranging information on distance from the target object received from the ranging unit and a dangerous distance pre-stored in the database of the central processing unit; and
    the warning unit performs warning according to a result of the comparison processing.

5. The guide spectacle of claim 3, wherein the ranging unit is any one of a Doppler effect-based ranging unit, an ultrasonic rangefinder, an infrared rangefinder and a laser rangefinder.

6. The guide spectacle of claim 1, further comprising an audio play unit, wherein the audio play unit is used for outputting the functional operations carried out by the functional unit as audio information.

7. The guide spectacle of claim 4, further comprising an audio play unit, wherein the audio play unit is used for outputting the functional operations carried out by the functional unit as audio information.

8. The guide spectacle of claim 6, wherein the audio play unit is a bone conduction earphone arranged on the spectacle frame.

9. The guide spectacle of claim 7, wherein the audio play unit is a bone conduction earphone arranged on the spectacle frame.

10. The guide spectacle of claim 1, further comprising a lens and a solar power supply unit arranged on the lens, wherein the solar power supply unit is used for supplying power to the signal collecting unit, the central processing unit and the functional unit.

11. The guide spectacle of claim 1, wherein a data transmission unit is further arranged on the spectacle frame, and the data transmission unit is used for communicating data with an external device.

12. The guide spectacle of claim 4, wherein a data transmission unit is further arranged on the spectacle frame, and the data transmission unit is used for communicating data with an external device.

13. The guide spectacle of claim 1, wherein the signal collection unit comprises more than one camera, and the cameras are arranged at a front side of the spectacle frame and at outer sides of left and right spectacle legs of the spectacle frame, so as to collect the road surface and surrounding environment information all around.

* * * * *